United States Patent [19]

Hudema et al.

[11] Patent Number: 4,736,583
[45] Date of Patent: Apr. 12, 1988

[54] ROCKET FIRING SYSTEM FOR SEQUENTIAL FIRING OF ROCKET MOTOR GROUPS

[75] Inventors: Henry P. Hudema; Stanley K. Burton; Alexander B. Markov; Clayton G. Coffey, all of Medicine Hat, Canada

[73] Assignee: Her Majesty the Queen in right of Canada as represented by the Minister of National Defence, Canada

[21] Appl. No.: 925,246

[22] Filed: Oct. 31, 1986

[30] Foreign Application Priority Data

Feb. 6, 1986 [CA] Canada ................... 501301

[51] Int. Cl.⁴ .................... F02K 9/95; F02K 9/30; F42B 15/12
[52] U.S. Cl. .................... 60/256; 60/225; 102/374; 102/380
[58] Field of Search ............... 102/374, 381, 377, 378, 102/380; 60/225, 250, 256, 253, 257; 89/1.814

[56] References Cited

U.S. PATENT DOCUMENTS

| | | | |
|---|---|---|---|
| 2,745,347 | 5/1956 | Lightbody et al. | 60/225 |
| 2,824,496 | 2/1958 | Kuller et al. | 89/1.814 |
| 2,956,401 | 10/1960 | Kane | 60/250 |
| 3,093,964 | 6/1963 | Hausmann | 60/253 |
| 3,142,959 | 8/1964 | Klein | 60/250 |
| 3,273,337 | 9/1966 | Bolieau | 60/256 |
| 3,304,724 | 2/1967 | Blumrich et al. | 60/257 |
| 3,701,256 | 10/1972 | Pelham et al. | 60/256 X |
| 3,712,227 | 1/1973 | Turner | 60/256 X |
| 3,748,955 | 7/1973 | Gatermann et al. | 89/1.814 |
| 4,573,316 | 3/1986 | Carrier et al. | 102/380 |

Primary Examiner—Ted L. Parr
Attorney, Agent, or Firm—Larson and Taylor

[57] ABSTRACT

An aerial target vehicle has an aerodynamically stabilized body carrying plural rocket motors. An ignition system for the motors serves to fire the motors in selected groups at selected time intervals. The ignition system uses a capacitor as its sole power source. The capacitor is charged only after the motors are in place and the vehicle is ready for launch. A capacitor-powered logic circuit ignites the motor groups at the selected time intervals. The sequential firing of the rocket motors provides a quasi-maneuverable target with relatively long range and flight time. The capacitive power arrangement is a safety factor that prevents premature firing of the rocket due to transient currents.

9 Claims, 5 Drawing Sheets

4,736,583

ROCKET FIRING SYSTEM FOR SEQUENTIAL FIRING OF ROCKET MOTOR GROUPS

FIELD OF THE INVENTION

The present invention relates to aerial targets and more particularly to rocket boosted aerial targets.

BACKGROUND

As weapons systems improve, they require more realistic training aids. One aspect of realistic training is the use of self-propelled aerial targets, including reusable drones driven by piston engines or gas turbines and expendable rocket boosted targets. The expendable targets are attractive from a cost point of view, but are not sufficiently realistic targets for modern weapons systems. The aim of the present invention is to provide an improved expendable target and components of an improved target system.

SUMMARY

According to one aspect of the present invention there is provided an aerial target vehicle comprising:
 an aerodynamically stabilized body;
 a plurality of rocket motors mounted on the body; and
 motor ignition means carried on the body for firing the rocket motors in selected groups at selected time intervals.

The sequential firing of the rocket motors provides a quasi-maneuverable target with a longer flight time and range.

Putting a sequence firing system on board the vehicle creates certain problems. Prominent is the question of safety since the rockets can be ignited by small transient currents generated by an onboard power source.

Thus, according to another aspect of the present invention there is provided a rocket firing system adapted to be carried on a rocket propelled vehicle having plural rocket motors, comprising:
 a capacitor; connector means for connecting the capacitor to a source of
 charging power external to the vehicle;
 ignition switches for electrically connecting the capacitor to respective groups of the rocket motors; and
 timing means for controlling operation of the switches.

The capacitor serves as the power supply for the firing system. Because the capacitor is not charged until immediately before launch of the vehicle, there is no power source on the vehicle to cause premature motor firing.

BRIEF DESCRIPTION OF THE DRAWINGS

In the accompanying drawings, which illustrate exemplary embodiments of the present invention.

DETAILED DESCRIPTION

Figure 2:
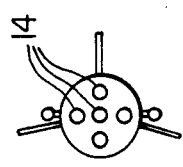
FIG. 2 is an aft end elevation of the vehicle of FIG. 1.
Figure 1:
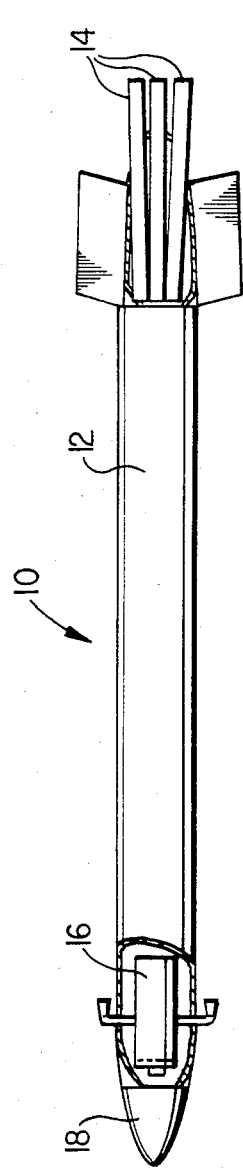
FIG. 1 is a side elevation, partially broken away, of a target vehicle according to one embodiment of the present invention.

Referring to the drawings, and particularly to FIGS. 1 and 2, there is illustrated a rocket boosted aerial target vehicle 10. This is a fin stabilized aerodynamically shaped body 12 with five 2.75 inch rocket motors 14 at the aft end and a solid propellant sustainer 16 adjacent the nose of the vehicle. The motors 14 are arranged with one motor along the vehicle axis and the other four arranged symmetrically around it. The nose cone 18 of the vehicle carries a sequential firing unit for firing the rocket motors in a desired, timed sequence. The vehicle may also carry appropriate radar augmentation equipment.

Figure 4:
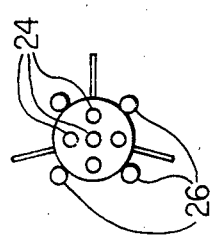
FIG. 4 is an aft end elevation of the vehicle of FIG. 3.
Figure 3:
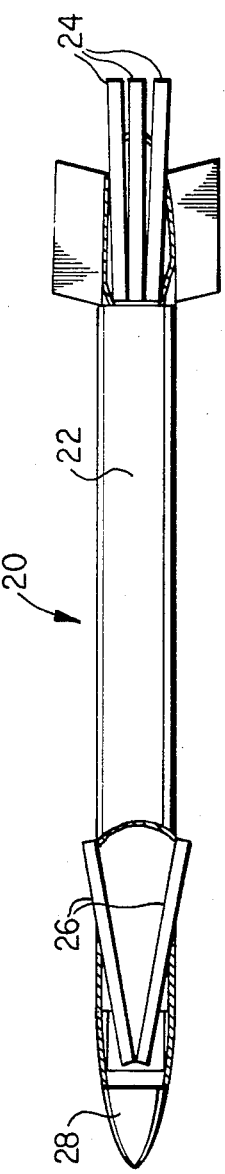
FIG. 3 is a view like FIG. 1 of another target vehicle according to the present invention.

FIGS. 3 and 4 of the drawings illustrate a vehicle 20 with a body 22 and five aft mounted motors 24. In this vehicle however, four additional 2.75 inch rocket motors 26 are fitted to the body just aft of the nose cone 28. No sustainer motor is used. As can be seen from FIG. 3, the four rocket motors 26 are distributed symmetrically about the body 12 and symmetrically with respect to the five motors 24.

Figure 5:
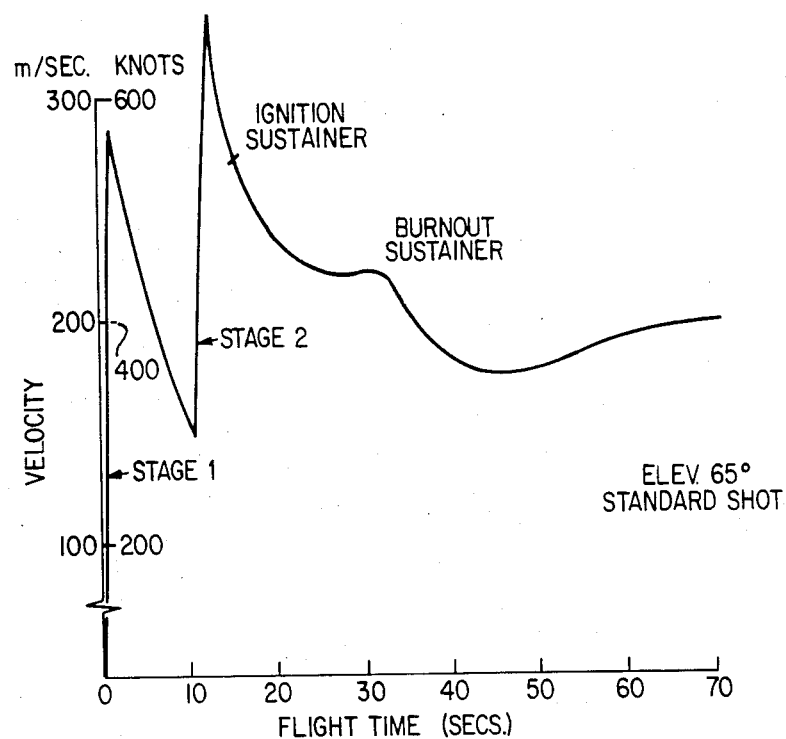
FIG. 5 is a plot showing the velocity versus time history of flight of the vehicle of FIGS. 1 and 2.
Figure 6:
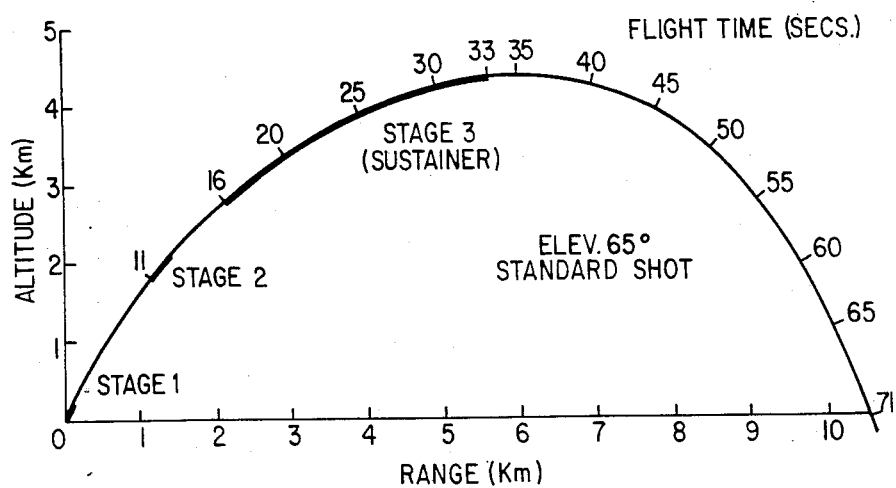
FIG. 6 is a plot showing the nominal trajectory of the flight depicted in FIG. 5.

Turning now to FIGS. 5 and 6, these are plots of velocity versus time and altitude versus range of a target such as that shown in FIGS. 1 and 2, where the motors 14 are fired in two stages, followed by ignition of the sustainer motor. The drawings show a situation where the axial motor and two diametrically opposed other motors 14 are ignited on launch to accelerate the vehicle rapidly to a velocity of about 300 meters per second when the rocket motors burn out, approximately two seconds after launch. The velocity then drops to about 150 meters per second at eleven seconds, when the two remaining motors 14 are ignited. This brings the velocity up to between 350 and 400 meters per second between 12 and 13 seconds after launch. The velocity then begins to drop and the sustainer motor is fired at 16 seconds to maintain a relatively high velocity until sustainer motor burnout at 33 seconds. The velocity then gradually decreases until the target reaches the peak of its ballistic path and increases as the target drops, according to the known laws of ballistics.

The illustrated flight is a standard shot at 65 degrees elevation.

Figure 7:
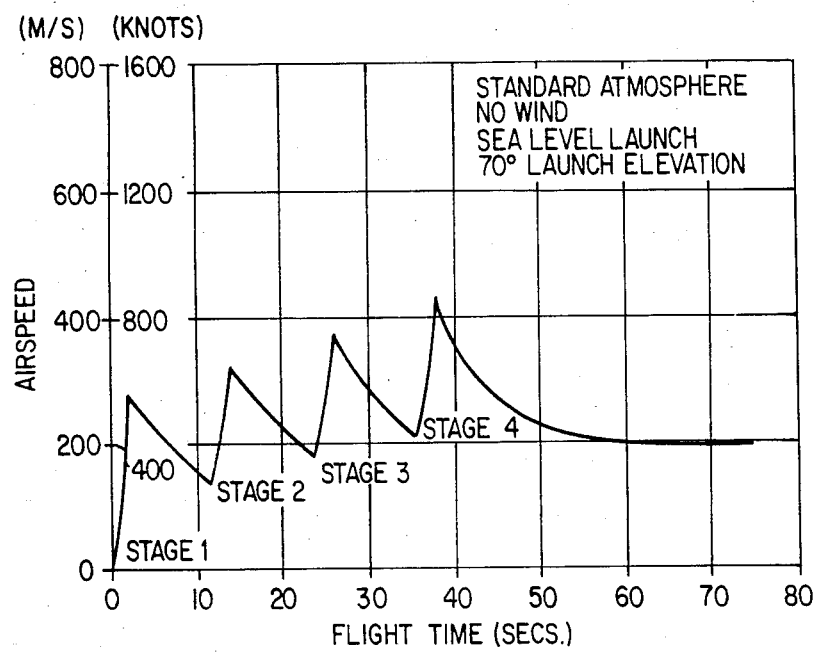
FIG. 7 is a plot of velocity versus time for a vehicle according to FIGS. 3 and 4.
Figure 8:
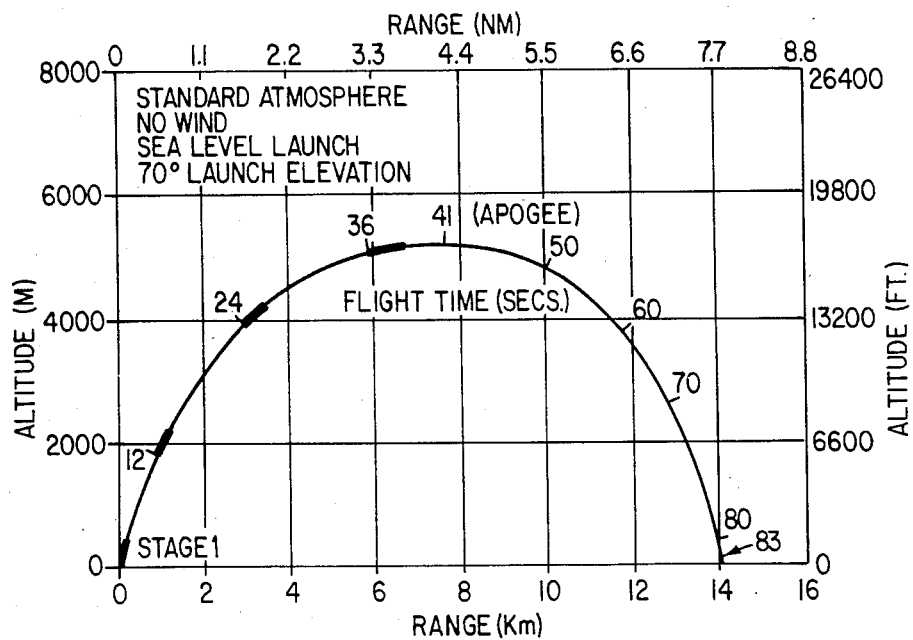
FIG. 8 is a plot showing the nominal trajectory of the flight depicted in FIG. 7.

FIGS. 7 and 8 are plots like FIGS. 5 and 6 of velocity versus time and trajectory for a vehicle as illustrated in FIGS. 3 and 4. The drawings represent the firing of three rocket motors 24 at the time of launch and the remaining six motors in groups of two diametrically opposed motors at twelve second intervals. The flight is a standard shot at 70 degrees elevation. The sequence firing of the motors produces substantial variations in the velocity of the vehicle with time. It also serves to extend the range of the vehicle and to maintain a more constant average velocity over the total flight time. These produce what may be referred to as a "quasi-maneuverable" flight that is a more realistic simulation of a target for weapons systems.

Figure 9:
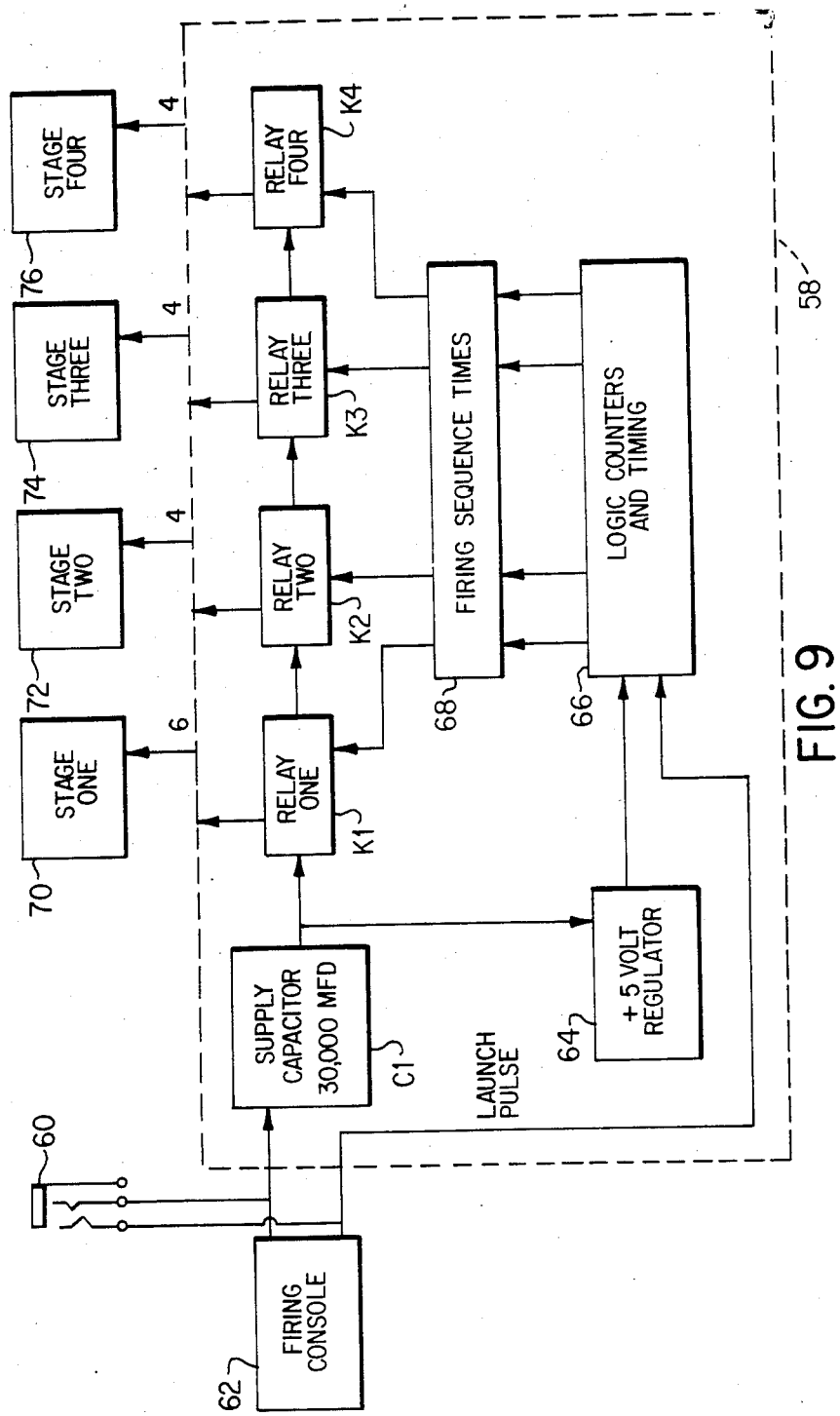
FIG. 9 is a schematic diagram of the firing system for a vehicle as shown in FIGS. 3 and 4.

A block diagram of the rocket firing system is shown in FIG. 9. The broken line illustrates the boundaries of a circuit board 58. All power required for both circuit operation and motor firing is contained in a 30,000 micro farad capacitor C1. This capacitor is shorted by a shorting jack 60 serving as a safe fire plug which is removed after all of the rocket motors have been loaded on the vehicle and connected. The ignition circuits for the rocket motors are shorted by respective relays K1 to K4 on the circuit board 58 until the time of motor firing.

When charging power is applied from an external target firing console 62, the capacitor C1 is charged to 28 volts and a 5 volt regulator 64 supplies power to logic circuitry 66, 68. When a subsequent launch pulse is sent from the target firing console 62, the logic counters 66 are initiated and stage 1 relay K1 fires the first stage rockets 70. The subsequent stages 72, 74 and 76 are then fired according to delay times preselected by the circuitry 68.

Figure 10:
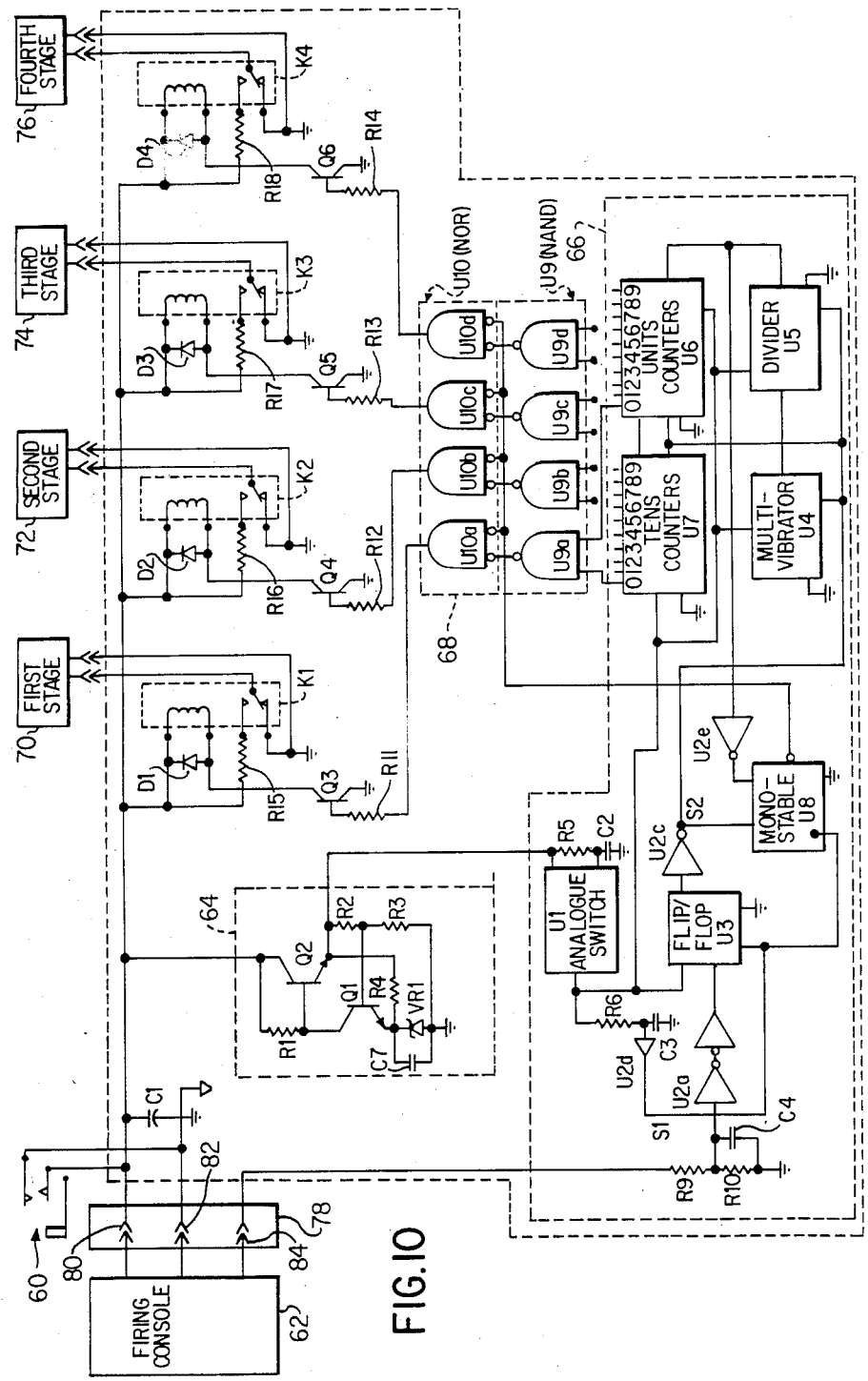
FIG. 10 is a wiring diagram of the firing system of FIG. 9.

The detailed circuit schematic of the firing system is illustrated in FIG. 10. Capacitor C1 is charged when charging power is applied from the firing console 62 through terminals 80 and 82 of a connector 78. Because the charge time of the capacitor is significant, an allowance is made in the firing console to prevent a launch pulse from being transmitted to the firing system through terminal 84 of connector 78 before the capacitor is fully charged.

The 5 volt regulator 64 consists of transistors Q1 and Q2, Zener YR1, resistors R1 to R4 and capacitor C7 connected as shown in FIG. 8. The regulator is operational as soon as charging power is applied to capacitor C1 but does not regulate until the voltage across the capacitor exceeds 6 volts. To prevent unknown logic states from occurring by different integrated circuits turning on at slightly different voltage levels, as would happen with a slowly increasing voltage before the regulator is regulating, an analogue switch U1 is inserted in-line between the regulator 64 and the logic circuits. The output of regulator 64 is also connected to a time delay consisting of resistor R5 and capacitor C2 connected in series. A control signal for switch U1 is taken off from between R5 and C2 so that analogue switch U1 is made after a delay determined by the time constant of R5 and C2. This constant is selected to be long enough to ensure that the voltage regulator 64 is fully operational (approximately 100 msec).

The output of the analogue switch U1 is applied to an inhibiting circuit consisting of series connected resistor R6 and capacitor C3, and Schmitt trigger U2d with its input connected between the resistor and the capacitor. The output S1 of the inhibiting circuit is applied to the reset pins of a flip-flop U3 and a monostable U8. Resetting U8 ensures that its output is high. This output is supplied to each gate of a quad NOR gate U10 to ensure that no output is possible from U10. As will be apparent from the following, this prevents a motor firing on power up of the system. Resetting the flip-flop U3 makes its output low. The low output is inverted by trigger U2c, and the high output S2 of the trigger resets astable multi-vibrator U4, divider U5, units counter U6 and tens counter U7 to initial states. This signal also prevents astable U4 from operating so that the circuit remains in its initial state as long as the low output of flip-flop U3 is present. After a time determined by R6 and C3 (approximately 100 msec) the output S1 of the inhibiting circuit is removed, enabling flip-flop U3 and monostable U8.

To trigger the timing circuit and initiate launch, a launch pulse from the console 62 to the firing system via terminal 84 of connector 78 must have a predetermined minimum voltage and current and must have a significant minimum duration. The pulse detection circuitry consists of resistors R9 and R10, capacitor C4 and Schmitt trigger U2a. When a proper launch pulse is detected, flip-flop U3 is clocked and S2 goes low. In response to this, astable U4 starts up, divider U5 and counters U6 and U7 are enabled and monostable U8 is triggered by the trailing edge of S2. Monostable U8 then generates a 25 msec. pulse which is applied to one terminal of each gate of the NOR gate decoder U10. The first gate U9a of a quad, two input, NAND gate U9 is connected to the 0,0 outputs of counters U6 and U7. As the counters are in the initialized state and the 0 outputs are true, the output of the first NAND gate U9a is low. This low output is applied to the first gate of NOR gate U10 and is so applied when U10a receives the low pulse from monostable U8. The first NOR gate U10a then emits a firing pulse to relay driver Q3 through resistor R11. This closes the normally open contacts of relay K1, sending a 28 volt firing pulse through resistor R15 to the first stage rocket motors 70.

The timing circuit for subsequent stages consists of astable U4, divider U5, counters U6 and U7 and decoders U9 and U10. Astable U4 and divider U5 function as a clock. The astable U4 oscillates at a fixed frequency, say 100 Hz and its output is divided to 1 Hz by divider U5. Each output pulse from divider U5 clocks the units counter U6 on its positive edge and triggers monostable U8 on its negative edge. This ensures settling time for the counter outputs to the decoder before the monostable pulse is sent to the decoder. The inputs to the decoder U9 from the outputs of units counter U6 and tens counter U7 are set according to the selected firing times. While the monostable U8 is triggered every second, a firing pulse is generated from the decoders only when the selected time is decoded.

The decoder gates U9b and U9d and U10b-U10d function in the same way as decoder gates U9a and U10a. When a firing time is detected by a gate U9b-U9d, its output to the corresponding gate of decoder U10 is low. When the low pulse for monostable U8 reaches the U10 decoder, a firing pulse is sent to the respective one of relay drivers Q4-Q6 via the respective resistor R12-R14. This closes the contacts of the associated relay K2-K4 and ignites the appropriate stage of rocket motors.

Diodes D1 to D4 are connected across the coils of relays K1 to K4 respectively and shorts the coils if a voltage of the wrong polarity is applied.

Use of the monostable U8 prevents rocket motor firing on application of charging power to the firing system. It also limits the length of the firing pulse to prevent excess current drain from the power capacitor C1 due to shorted firing lines or ionization shorts when the squibs fire. This ensures that sufficient power is maintained in the capacitor to fire all stages.

While certain specific embodiments of the invention have been described in the foregoing, it is to be understood that other embodiments are possible within the scope of the present invention. For example, it is possible to realise the ignition system in other specific circuits, using other components. The vehicle itself can be constructed to use other than the exemplified numbers of rocket motors. It is also possible to apply the invention to a vehicle having aerodynamic lifting properties rather than a purely ballistic vehicle.

We claim:

1. A rocket firing system adapted to be carried on a rocket propelled vehicle for controlling the firing in groups of plural rocket motors on the vehicle, comprising:
   a capacitor;
   connector means for connecting the capacitor to a source of charging power external to the vehicle;
   ignition switches for electrically connecting the capacitor to respective groups of the rocket motors; and
   timing means for controlling operations of the switches.

2. A system according to claim 1, wherein the timing means are electrically operated and electrically connected to the capacitor to receive operating power therefrom.

3. A system according to claim 2, wherein the connector means include means for connecting the timing means to a launch signal source external to the vehicle and the timing means are responsive to a launch signal from the launch signal source to initiate operation of the timing means.

4. A system according to claim 3, including a voltage regulator connected between the capacitor and the timing means.

5. A system according to claim 4, including time delay means connected to the voltage regulator, switch means connected between the voltage regulator and the timing means and to the time delay means, the switch means being adapted to close in response to a control signal from the time delay means representative of a predetermined elapsed time from an application of electric power to the voltage regulator.

6. A system according to claim 2, wherein the timing means include a counter and a decoder connected to the counter to generate firing time signals when preselected firing times are reached.

7. A system according to claim 6, wherein the counter includes clock means for operating the counter at a predetermined rate.

8. A system according to claim 7, including a pulse generator for generating firing pulses at a predetermined rate and for a predetermined duration, a second decoder receiving the firing time signals and the firing pulses and emitting ignition signals to the respective ignition switches while a firing time signal and a firing pulse are simultaneously being received.

9. A system according to claim 8, including inhibiting means connected to the switch means and the pulse generator, the inhibiting means operating in response to closing of the circuit power switch to generate an initial inhibiting signal for a predetermined time, the pulse generator being responsive to the receipt of the inhibiting signal to send an ignition inhibiting signal to the second decoder, preventing the decoder from emitting an ignition signal.

* * * * *